(12) United States Patent
McCarty et al.

(10) Patent No.: US 6,955,463 B2
(45) Date of Patent: Oct. 18, 2005

(54) WINDOW COVERING DISPLAY DEVICE

(75) Inventors: Michael J. McCarty, Rancho Santa Margarita, CA (US); Kelly Ann Reed, Brea, CA (US); Michael W. Edwards, Huntington Beach, CA (US)

(73) Assignee: 3 Day Blinds, Inc., Anaheim, CA (US)

( * ) Notice: Subject to any disclaimer, the term of this patent is extended or adjusted under 35 U.S.C. 154(b) by 252 days.

(21) Appl. No.: 10/639,141

(22) Filed: Aug. 12, 2003

(65) Prior Publication Data

US 2004/0037345 A1 Feb. 26, 2004

Related U.S. Application Data

(60) Provisional application No. 60/405,522, filed on Aug. 23, 2002.

(51) Int. Cl.[7] .............................................. G01K 5/00
(52) U.S. Cl. ..................................... 374/189; 160/123
(58) Field of Search ............................... 374/100, 189, 374/204; 160/123, 124

(56) References Cited

U.S. PATENT DOCUMENTS 4,555,764 A * 11/1985 Kuehn .......................... 700/299
4,621,615 A * 11/1986 McGee ......................... 126/572

* cited by examiner

*Primary Examiner*—Kenneth Noland
(74) *Attorney, Agent, or Firm*—Rutan & Tucker, LLP

(57) ABSTRACT

There is provided a display device which comprises a display housing. The display housing has an internal compartment defined by a plurality of connected panels. At least one of the panels is a heat-conducting panel which simulates a glass window. Moreover, a heat source is disposed within the inside compartment for generating heat therein. In addition, a plurality of window coverings each having a specific heat insulation property corresponding thereto are further provided. Each respective one of the plurality of window coverings are removably mountable to the display housing to insulate the heat conducting through the heat-conducting panel from within the internal compartment. By doing so, a consumer is able to determine the heat insulation property of each respective on of the plurality of window coverings.

18 Claims, 3 Drawing Sheets

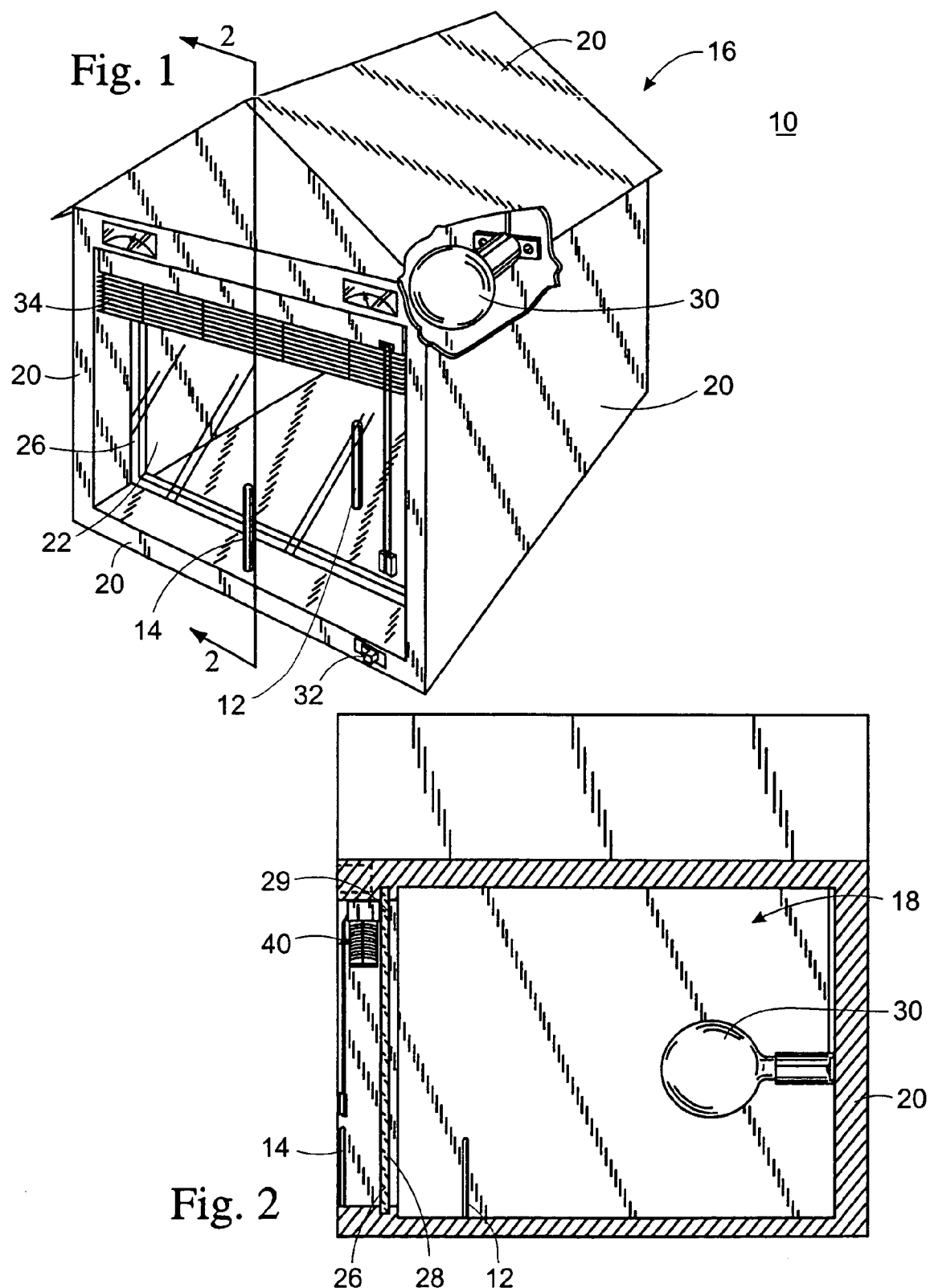

WINDOW COVERING DISPLAY DEVICE

CROSS-REFERENCE TO RELATED APPLICATIONS

This application claims the benefit of U.S. Provisional Application No. 60/405,522, filed Aug. 23, 2002, the entire contents of which are hereby incorporated by reference.

STATEMENT RE: FEDERALLY SPONSORED RESEARCH/DEVELOPMENT (Not Applicable)

BACKGROUND OF THE INVENTION

The present invention relates generally to display devices, and more particularly to an improved point-of-sale display device adapted to removably mount plural window coverings along its heat-conducting glass panel to quickly observe and determine each window covering's heat insulation properties.

It is common knowledge that heat flows by three mechanisms: conduction, convection, and radiation. In general, conduction refers to molecule-to-molecule transfer of kinetic energy through a solid body. Convection is the transfer of heat by physically moving the molecules from one place to another through a gas such as air. Radiation is the transfer of heat, i.e., light energy, through space via electromagnetic waves. The understanding of how the heat flows plays a significant role when constructing buildings and dwellings as it is imperative to comfortably accommodate residents therein.

Typically, heat will conduct, i.e., flow, from a warm side of a material and gradually move through it to the colder side. As such, many buildings and dwellings are constructed out of materials that are designed to mitigate the heat flow therethrough, whether it is from the outside or the inside. However, windows of buildings and dwellings are poorly adapted to adequately exclude or reduce heat transfer via conduction, convection and/or radiation therethrough. This poses a significant problem in real-life situations where significant temperature changes occur over the course of a day.

In order to address this head transfer problem, window coverings often used on windows not only for esthetic purposes but for mitigating heat transfer from the outside to the inside of the structure. Better heat insulation means significant energy and cost savings. However, there are many different types of window coverings in the current marketplace and consumers are often confused as to which one is most suited for insulating heat. Consequently, many consumers buy window coverings only to find that they fail to possess desired heat transfer characteristics.

In this regard, some window covering manufacturers have started to label their window coverings with R-values. The logic behind rating their window coverings with R-values is to attempt to inform the consumers of the window coverings' insulating effectiveness. The higher the R-value, the greater the insulating effectiveness, and vice-versa.

However, because the R-value is not a commonly used household term, most consumers do not fully appreciate its significance nor realize what R-values indicate. Even if they were to have some general understanding that higher R-valued window coverings equal better insulation, most consumers do not know how much better they are in comparison to others.

Thus, there exists a substantial need in the industry, and in the window covering business in particular, for a display device that enables consumers to visually observe a window coverings' insulation property without resorting to R-values. Further, there exists a need for a point-of-sale display device that allows consumers to easily and rapidly compare the insulation properties of different types of window coverings in a user-friendly manner, while mitigating expenditures of time and energy when doing so.

BRIEF SUMMARY OF THE INVENTION

The present invention specifically addresses and overcomes the above-described deficiencies of prior art window coverings by providing a display device specifically adapted to conveniently enable a consumer to determine relative heat insulation properties of differing window coverings. By doing so, the consumer may quickly visually compare the insulation effectiveness of differing window coverings without resorting to labeled R-values. In this respect, not only is the present invention capable of directly identifying relative insulation properties of differing window coverings without the need of any complicated or confusing converted measurements, but accomplishes such task in a user-friendly point-of-sale display.

In accordance with a preferred embodiment of the present invention, there is provided a display device for enabling a consumer to observe and/or determine a window covering's heat insulation property that is selected from a wide selection thereof. Such device comprises a display housing which has an internal compartment defined by a plurality of connected wall panels. At least one of the panels comprises a glass panel with a wooden support frame around its peripheral edges which simulates a conventional glass window of a residential or commercial building. Of course, it is preferred that the remaining panels be formed from materials that are less heat conducting than the glass panel, such as wooden panels, for example.

In the preferred embodiment, a heat source is disposed within the internal compartment for the purpose of generating heat therein. Preferably, the heat source comprises a light bulb operative to be turned on and off via an external switch. The light bulb stimulated the sun to produce radiant and convection heat which is conducted via the glass panel. By generating heat to a prescribed temperature within the internal compartment, a similar duplication of and outside environmental temperature can be represented. Additionally, an inner temperature measuring sensor, preferably a laser thermometer, is positioned within the internal compartment.

The display housing of the present invention is sized and configured to removably mount plural window coverings generally parallel along its heat-conducting glass panel. More specifically, there is provided two retaining members disposed about an upper peripheral edge of the glass panel. The retaining members comprise brackets positioned generally above the upper peripheral edge and are distantly separated from each other sufficient to accommodate end portions of the selected window covering thereto. In this manner, the brackets are each configured to receive the respective end portions of the window covering so as to maintain the selected window covering generally above the upper peripheral edge. When this occurs, the window covering may slide down from a retracted position to an extended position to thereby substantially cover the glass panel.

In accordance with a preferred embodiment of the present invention, there is further provided an outer temperature measuring sensor. The outer temperature measuring sensor is positioned outside of the internal compartment adjacent the heat-conducting glass panel. Preferably, the outer temperature measuring sensor is a laser thermometer. The outer temperature measuring sensor should be sufficiently distant from the glass panel so as to allow the positioning of the window covering therebetween when it is slid down. In this way, a simulation of an inside of a residential and/or commercial building is represented (i.e., sunlight hitting the window covering from outside towards the inside of a residential and/or commercial building).

In operation, a window covering may be selected by a consumer to evaluate its heat insulation effectiveness. The consumer may choose a window covering from a wide selection (e.g., fabric, vertical, wood, or metal blinds and/or pleated or cellular shades). The selected window covering can then be snapped into the retaining members and slide down to substantially cover the entirety of the glass panel. Further, such window covering should be closed so as to effectively capture and insulate the heat conducting through the glass panel. Preferably, the heat source should be turned on in order to generate the heat within the internal compartment.

Upon generating the heat within the internal compartment, the consumer can easily observe that temperature by looking at the inner temperature measuring sensor. Simultaneously, the consumer can further look at the outer temperature measuring sensor as the window covering is disposed between it and the glass panel. As will be recognized, alternatively, a manual hand held temperature sensor can be used by the user to measure the outside temperature. As such, the consumer is able to quickly observe and determine the insulation property of the window covering by comparing the temperature difference before and after insulation or, in the alternative, the same can be accomplished by comparing the temperature difference between the inner and outer temperature measuring sensor. Of course, the window covering may be conveniently removed thereafter so that other window covering's insulation effectiveness may be evaluated in the same manner.

BRIEF DESCRIPTION OF THE DRAWINGS

These as well as other features of the present invention will become more apparent upon reference to the drawings wherein:

FIG. 1 is a perspective view of a display device constructed in accordance with a preferred embodiment of the present invention, illustrating its heat-conducting glass panel disposed between inner and outer temperature measuring sensors;

FIG. 2 is a cross-sectional view of the display device shown in FIG. 1, illustrating its internal compartment with a heat source disposed therein;

DETAILED DESCRIPTION OF THE INVENTION

Figure 3:
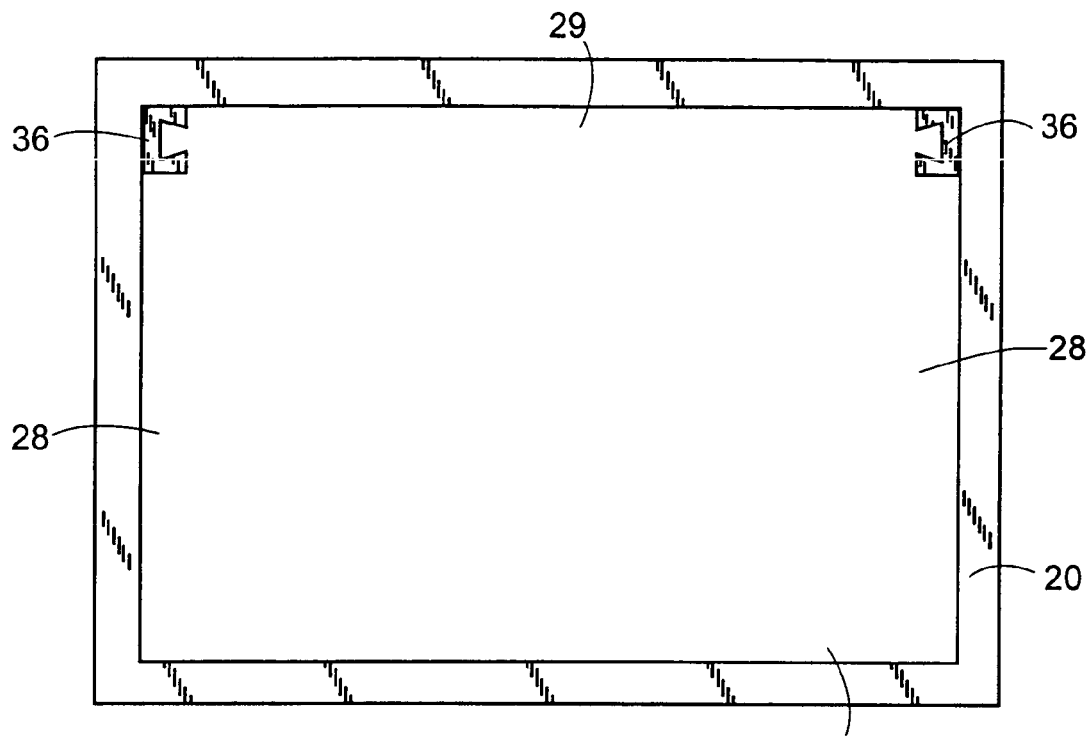
FIG. 3 is a partial front view of the display device shown in FIG. 1, illustrating its retaining members disposed about an upper peripheral edge of the glass panel for removably engaging each respective one of a plurality of window coverings thereto.

Referring now to the drawings wherein the showings are for purposes of illustrating preferred embodiments of the present invention only, and not for purposes of limiting the same. FIG. 1 perspectively illustrates a display device 10 constructed in accordance with a preferred embodiment of the present invention. As indicated above, the display device 10 enables a consumer to quickly observe and determine each window covering's heat insulation properties. Those of ordinary skill in the art will recognize that the display device 10 may be formed to have a variety of shapes, configurations, geometries, sizes and textures other than for that shown in the provided Figures.

Referring now to FIGS. 1 and 2, the display device 10 comprises a display housing 16. Although the display housing 16 is shaped in the form of a house, such depiction is exemplary in nature and should not be limited thereto. In particular, the display housing 16 defines an internal compartment 18. The internal compartment 18 is formed by a plurality of connected wall panels 20. More particularly, the panels 20 which are vertically erected from the walls of the display housing 16. Other panels 20 can be adjoined to vertically-erected panels 20 in any desired configurations in order to form other parts of the display housing 16, such as its ceiling or floor, for example.

At least one of the panels 20 that form the walls of the display housing 16 may be characterized as a heat-conducting panel 22. The heat-conducting panel 22 is adapted to conduct heat therethrough at a greater rate than the rest of the wall panels 20.

In the preferred embodiment, the heat-conducting panel 22 is a glass panel 24 with a support frame 26 formed around its peripheral edges 28 which simulates a conventional glass window of a residential or commercial building. The glass panel 24 can be connected to other adjacent panels 20 via the support frame 26 thereof. The support frame 26 is preferably fabricated from a wooden material. Because it is recommended that the heat-conducting panel 22 conducts heat at a greater rate than others, other panels 20 should be formed from materials that are less heat conducting than the glass panel 24. For instance, the remaining panels 20 may be fabricated from a wooden material as it is generally incapable of conducting heat faster than the glass. Furthermore, for the reasons that will be discussed below, more than one of the vertically-erected wall panels 20, or even all of them, may be construed as heat-conducting panel 22 designed in the similar fashion above.

There is provided a heat source 30 disposed within the internal compartment 18 for the purpose of generating heat therein. Preferably, the heat source 30 is a light bulb that can be activated/deactivated by an electrically communicated external switch 32. However, it will be appreciated by those of ordinary skill in the art that other forms of heat source (e.g., heat lamps) may be utilized in lieu of the light bulb. The light bulb simulates the sun to produce radiant and convection which is conducted via the glass panel 24. In this respect, the internal compartment 18 is representative of an outside environment and thus stimulates its temperature. Simply, put, the heat source 30 can generate heat within the internal compartment 18 to a prescribed temperature as to represent the desired outside setting.

Figure 4:
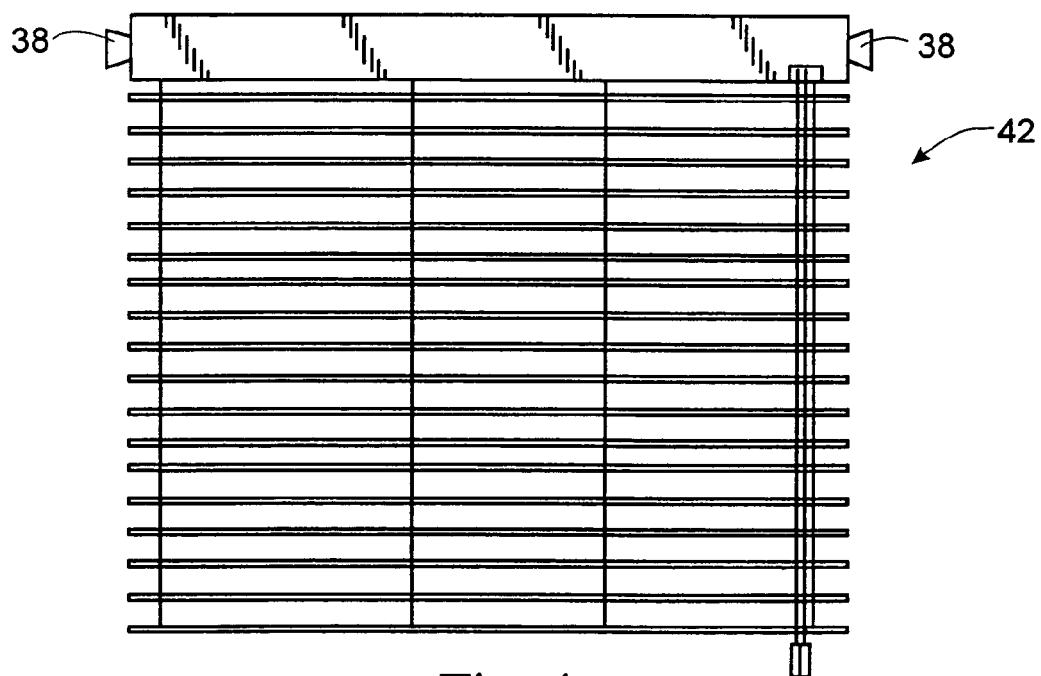
FIG. 4 is a front view of an exemplary window covering chosen from a selection thereof forming an open position when removably engaged to the retaining members of FIG. 3.
Figure 5:
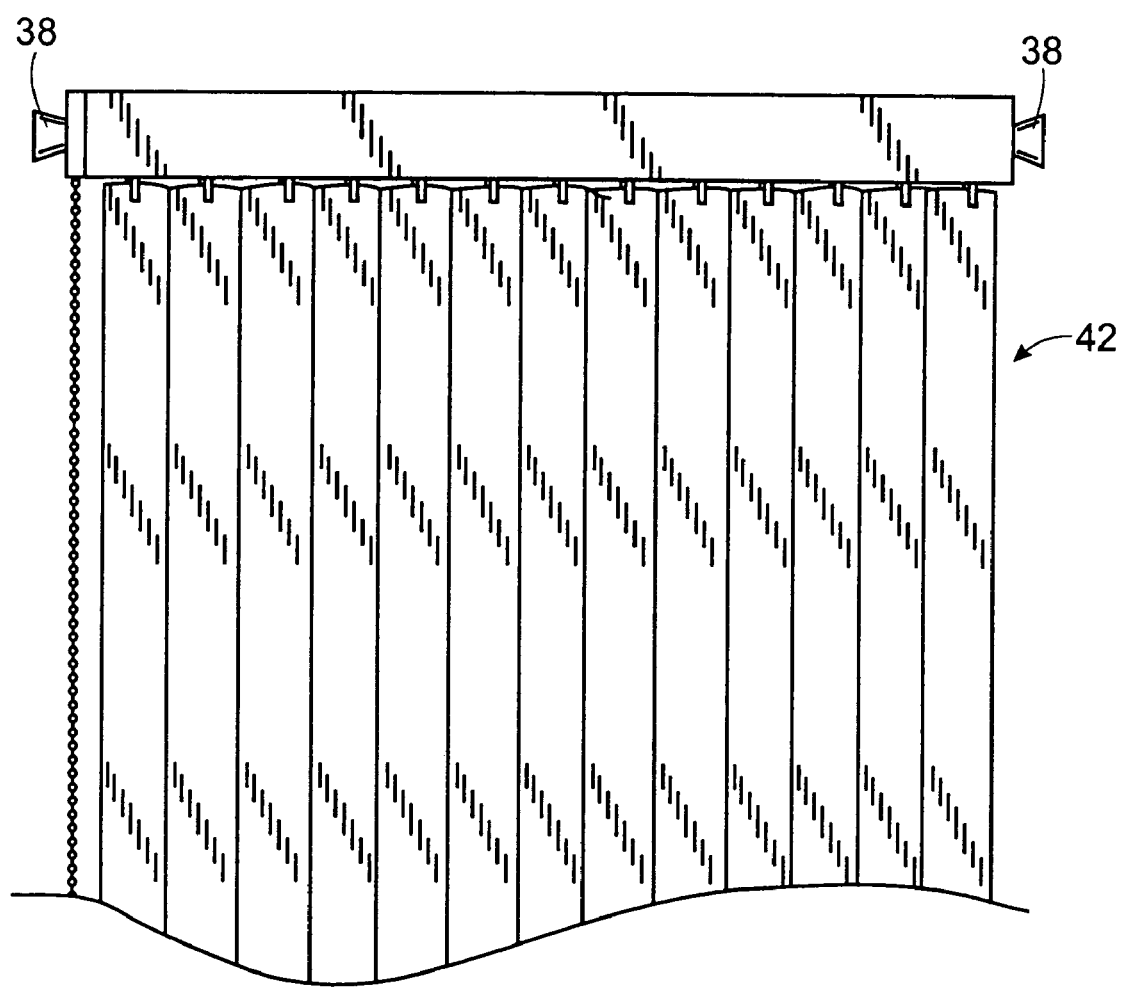
FIG. 5 is a front view of another exemplary window covering chosen from a selection thereof forming a closed position when removably engaged to the retaining members of FIG. 3.

Referring more particularly to FIGS. 3–5, the display housing 16 is adapted to removably mount plural window coverings along its glass panel 24. To accomplish such objective, retaining members 36 are disposed about an upper peripheral edge 29 of the glass panel 24. Preferably, there are two brackets serving as the retaining members 36 which are positioned generally above the upper peripheral edge 29. The two brackets should be sufficiently and laterally separated from each other so as to respectively receive and maintain end portions 38 of the selected window covering 34 thereto. The brackets should be sufficient in size as to comfortably snap-on and snap-off the respective end portions 38 of the window covering 34.

The retaining members 38 position the window covering 34 above the upper peripheral edge 29 such that it may slide up and down between retracted and extended positions 40, 42. As such, the heat-conducting glass panel 24 is substantially exposed when the window covering 34 forms the retracted position 40. Or, the glass panel 24 is substantially covered when the window covering 34 slides down and forms the extended position 42. Obviously, it is recommended that the window covering 34 further be closed 44 when extended along the glass panel 24 in order to fully insulate the heat conducting therethrough. Further, when the window covering 34 retracts to the top, it should be open 45 so as to facilitate its transition.

Temperature measuring sensors 12, 14 are strategically positioned with respect to the display housing 16 such that the consumer can quickly and simultaneously observe and determine the temperature difference formed therebetween. One manner of achieving such objective is to place an inner temperature measuring sensor 12 within the internal compartment 18 and an outer temperature measuring sensor 14 outside of the internal compartment 18 adjacent the heat-conducting glass panel 24. Preferably, the inner and outer temperature measuring sensors 12, 14 are thermometers. Even more preferably, they are laser thermometers.

The outer temperature measuring sensor 14 should be sufficiently distant from the glass panel 24 such that the window covering 34 can be disposed therebetween when extended. Alternatively, the outer temperature measuring sensor can be a manual hand held sensor. In this way, a simulation of an inside setting of a residential and/or commercial building may be duplicated (i.e., sunlight hitting the window covering from outside towards the inside of the residential and/or commercial building).

In operation, a window covering 34 may be selected by a consumer to evaluate its heat insulation effectiveness. The consumer may choose a window covering 34 from a wide selection. Such selection may comprise a fabric blind, a vertical blind, a wood blind, a metal blind, a pleated shade, and a cellular shade. However, other types of blinds can be incorporated into the selection. The end portions 38 of the selected window covering can then be engaged/snapped into the retaining members 36. When engaged therein, the window covering 34 can be extended to substantially cover the entirety of the glass panel 24. Further, such window covering 34 should be closed so as to properly insulate the heat conducting through the glass panel 24 from within the internal compartment 18.

When the internal compartment 18 is heated to a prescribed temperature (e.g., 90 degrees Fahrenheit). The consumer can easily and rapidly observe that temperature by looking at the inner temperature measuring device 12. Simultaneously, the consumer can further look at the outer temperature measuring device 14 as the extended window covering 34 is disposed between it and the glass panel 22. In this regard, the consumer is able to visually observe, first-hand, the insulation property of the selected window covering 34 by comparing the temperature difference therebetween. Of course, the window covering 34 may be conveniently removed thereafter so that a different window covering 34 may be mounted to determine its insulation effectiveness via the similar process.

As explained above, the display device 10 may have more than one heat-conducting panel 22 so that a number of window coverings' insulation properties may be measured simultaneously. When there are more than one heat-conducting panel 22, the consumer can simply engage an equal or less number of window coverings 34 thereto similar to the manner specified above to insulate the heat conducting respectively therethrough. By positioning an outer temperature measuring sensor 14 adjacent to each of the extended window coverings 34, a number of insulation properties can be simultaneously evaluated.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A display device for enabling a consumer to determine heat insulation properties of a plurality of window coverings, the display device comprising:
    a display housing having an internal compartment defined by a plurality of connected panels, at least one of the panels comprising a heat-conducting panel simulating a glass window;
    a heat source disposed within the internal compartment for generating heat therein; and
    a plurality of window coverings each having a specific heat insulation property corresponding thereto, each respective one of the plurality of window coverings being removably mountable to the display housing and parallel extending along the heat-conducting panel to insulate the heat conducting there though from within the internal compartment so as to enable the consumer to determine the heat insulation property of each respective one of the plurality of window coverings.

2. The display device of claim 1 wherein the heat-conducting panel is a transparent panel.

3. The display device of claim 2 wherein the transparent is a glass panel.

4. The display device of claim 3 wherein the glass panel has peripheral edges with a support frame there around, the glass panel being connected to other panels positioned adjacent thereto via the support frame thereof.

5. The display device of claim 4 wherein the support frame is fabricated from a wooden material.

6. The display device of claim 1 wherein the remaining panels are each fabricated from a wooden material.

7. The display device of claim 1 wherein the heat source is a light bulb.

8. The display device of claim 1 wherein the plurality of window coverings comprise a fabric blind, a vertical blind, a wood blind, a metal blind, a pleated shade and a cellular shade.

9. The display device of claim 1 wherein the display housing comprises retaining members and the heat-conducting panel has an upper peripheral edge, the retaining members being generally disposed about the upper peripheral edge for removably engaging each respective one of the plurality of window coverings thereto.

10. The display device of claim 9 wherein the retaining members are brackets positioned above the upper peripheral edge, each respective on of the plurality of window coverings having end portions, the brackets being sized and configured to receive and maintain the end portions of each respective one of the plurality of window coverings above the upper peripheral edge.

11. The display device of claim 10 wherein each respective one of the plurality of window coverings alternate between retracted and extended positions when maintained above the upper peripheral edge.

12. The display device of claim 1 further comprising an inner temperature measuring sensor positioned within the internal compartment for measuring the heat generated within.

13. The display device of claim 12 further comprising an outer temperature measuring sensor positioned adjacent the heat-conducting panel and wherein each respective on of the plurality of window coverings is extendable there between when forming an extended position, the outer temperature measuring sensor being operative to measure the heat subsequent to insulation by each respective one of the plurality of window coverings.

14. The display device of claim 13 wherein the inner and outer temperature measuring sensors are thermometers.

15. The display device of claim 14 wherein the thermometers are laser thermometers.

16. The display device of claim 1 wherein the display housing comprises vertically-erected panels forming walls thereof, the heat-conducting panel being one of the vertically-erected panels.

17. The display device of claim 16 wherein more than one of the vertically-erected panels are heat-conducting panels for allowing more than one of the plurality of window coverings to parallel extend there along to insulate the heat conducting respectively there through from within the internal compartment.

18. The display device of claim 1 wherein the display housing comprises an external on/off switch for activating and deactivating the heat source.

* * * * *